Oct. 14, 1958 H. J. DE WINDT 2,856,064
CONVEYOR FLIGHT BELT
Filed May 29, 1953
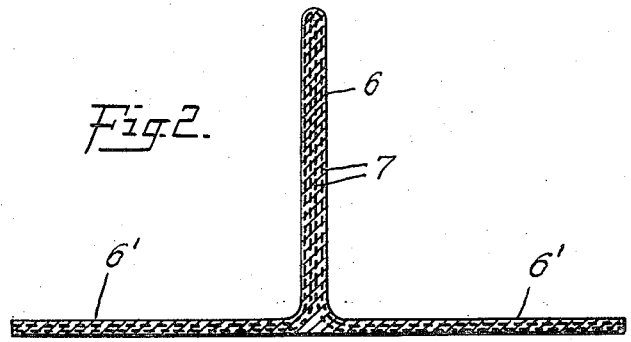
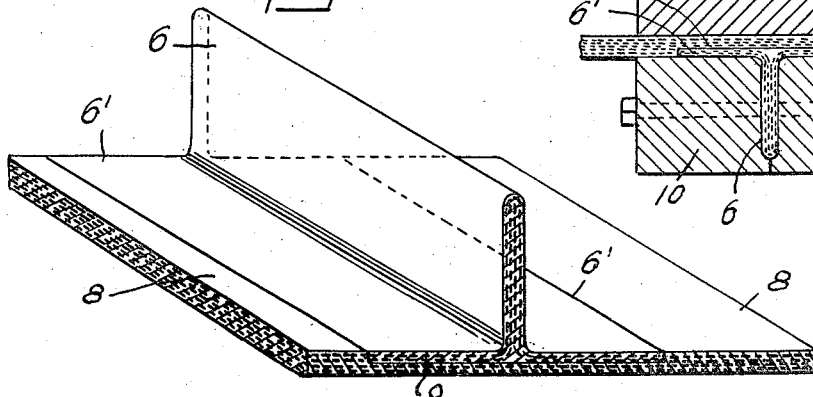
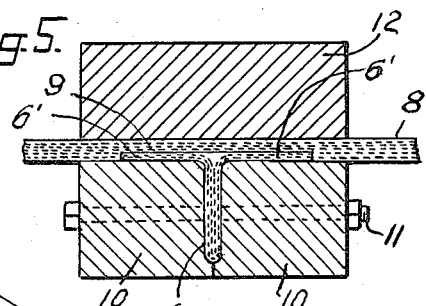
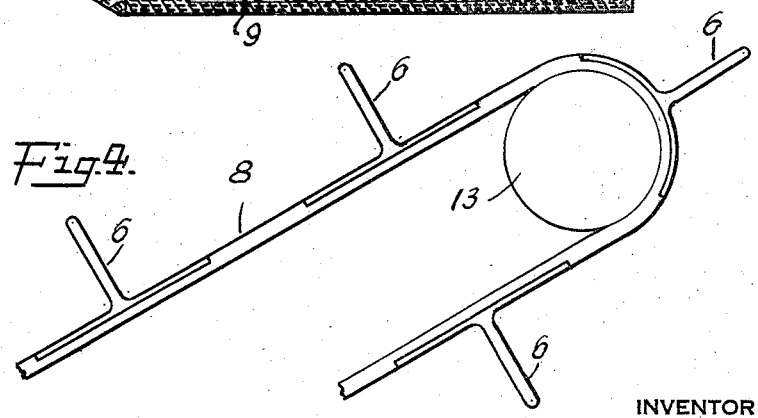
INVENTOR
Herbert John De Windt
BY
Pennie, Edmonds, Morton, Barrows, Taylor
ATTORNEYS

United States Patent Office 2,856,064
Patented Oct. 14, 1958

2,856,064

CONVEYOR FLIGHT BELT

Herbert John de Windt, Grand Rapids, Mich., assignor to Ton-Tex Corporation, Grand Rapids, Mich., a corporation of Michigan Application May 29, 1953, Serial No. 358,483

4 Claims. (Cl. 198—198)

This invention relates to conveyor or elevator belts, and particularly to conveyor belts having upstanding flights or cleats for holding material on a moving belt. The invention has for its object the provision of an improved construction of flight for conveyor belts and the like. Heretofore the flights or cleats on conveyor belts have commonly been of metal bolted, riveted or otherwise mechanically attached to the belt. Even where non-metallic flights (e. g. wood, molded rubber, etc.) have been used, they have been mechanically secured to the belt. In the normal operation of the belt, the mechanical connection of the flight to the belt works loose and granular material works into the loosened connection with attendant damage to the belt or the flight or both. The mechanical connection of the flight to the belt is frequently subjected to undue strain as the connection passes over the pulleys on which the belt is operatively mounted, due to non-uniform flexing of the belt as it passes over the pulleys, and such strain accelerates loosening of the mechanical connection.

The present invention is particularly concerned with multi-ply fabric belts in which a plurality (usually five or more) of plies or layers of fabric, such as cotton duck or canvas, are cemented together in a laminated structure by vulcanization, and is characterized in that the belt is provided with spaced upstanding flights or cleats constructed of vulcanized laminated fabric, like the belt, and the flights are secured to the belt by vulcanization. Thus, in the improved flight belt of the invention, the flights are constructed like the belt itself of a plurality of plies of fabric cemented together by vulcanization, and the flights are secured in spaced relation to the belt by vulcanization without appreciable increase in the belt thickness proximate the flights.

The invention will be better understood from the following description of the improved belt, its mode of manufacture and its advantages taken in conjunction with the accompanying drawing, in which Fig. 1 is a sectional elevation of a belt prepared for insertion of a flight form;

Fig. 2 is a sectional elevation of a flight form prepared for insertion in the prepared belt of Fig. 1;

Fig. 3 is a perspective view of the flight secured to the belt by vulcanization;

Fig. 4 is a side elevation of the upper end of an inclined endless flight conveyor belt embodying the invention, and Fig. 5 is an explanatory diagrammatic view of one form of vulcanizing press used in making the flight belt of the invention.

The form for the flight 6 (Fig. 2) is cut to approximate size from a roll of fabric which has been coated or calendered with sufficient rubber-type cement to thoroughly impregnate it. The flight form is cut with the run of the roll the same as the run of the fabric in the belt, so that with the run of the fabric in the flight coinciding with the run of the fabric in the belt danger of the flight fabric being fractured by flexing is reduced to the minimum.

After being cut, the flight forms of individual layers of rubber-impregnated fabric are superposed, two such superposed pieces or plies 7 of fabric being shown in the drawing. The superposed pieces are folded together, clamped between supporting blocks of the proper shape and size, then the end portions 6' are divided and flattened out to form the base of an inverted T-shape structure which is placed in a cold press for sufficient time to insure retention of the T-shape. The resulting T-shape structure, i. e. the flight form, is then trimmed to a uniform size.

The belt 8, shown as 5-ply fabric in the drawing, is prepared for insertion of the flight by cutting out two fabric plies to form a mating recess or groove 9 of the same dimensions as the flattened end portions or base 6' of the prepared flight form. The recess in the belt and the end portions 6' are coated or calendered with the rubber-type cement and fitted together. The flights are then secured to the belt by vulcanization with the upper surface of each flight base merging smoothly with the adjacent surfaces of the belt. Fig. 5 diagrammatically illustrates the usual vulcanization procedure. The flights 6 are clamped between aluminum blocks 10 by means of end bolts 11, and the belt and blocks are placed in a hot vulcanizing press of which only the upper plate 12 is shown in Fig. 5. Pressure is thus provided in two directions, first to force the flight into the recess in the belt, and second to compact the plies of the flight form itself. The aluminum blocks 10 provide a means for clamping the flight and also a support in the press for vulcanizing the flight to the belt. The high heat conductivity of aluminum insures ready heat transfer to the parts undergoing vulcanization, which is necessary to insure proper vulcanization of the flight itself and of the flight to the belt. After all of the flights have been vulcanized to the belt, their ends are trimmed to the width of the belt, and the flight belt is ready for use.

While it is preferred not to vulcanize the flight forms prior to fitting them into the mating recesses in the belt, the flight forms may be separately vulcanized, and the prevulcanized flights then attached to the belt by vulcanization substantially as hereinbefore described. In either case, the flight is vulcanized into the body of the belt and hence securely bonded thereto with no gaps or crevices between the flight and the belt. The vulcanized bond between the flight and the belt is so strong that the flight does not pull out in the contemplated use of the flight belt. The flights may be of any desired height, width and spacing on the belt. Usually, the flights are perpendicular to the belt, but they may have any other desired angular relation to the belt.

The flight belt of the invention is of substantially uniform thickness throughout, since the flights are secured to the belt without any significant increase in the belt thickness proximate the flights. This insures uniform flexing of the belt as it passes over its cooperating pulleys, such as the pulley 13 in Fig. 4, where it will be noted that the bases 6' of the flights follow the contour of the pulley without damage to the bond between the flight and the belt. Such uniform flexing of the belt prevents any undue strain on the flights which might tend to loosen them or rupture the belt. Thus, the flight belt of the invention possesses an amount of resilience and flexibility not possible in a belt in which the flights are mechanically secured to the belt. Moreover, because of the complete absence of any voids or openings in the belt of the invention, it is impossible for granular or other material to insinuate itself between the flight and the belt with consequent damage to one or the other as the belt passes over the pulleys on which it is operatively mounted.

Due to the method of folding and inserting the multiply flight into the upper plies of the belt and its vulcanization thereto, great strength is imparted to the flight at its juncture with the belt, without sacrificing flexibiliy in the belt itself. Also, because the run of the flight fabric plies coincides with the run of the fabric plies of the belt, the danger of the flight fabric being fractured by flexing is reduced to the minimum. By fabricating the belt and flight with neoprene or equivalent synthetic rubber type of cement, the use of the flight belt may be extended to applications where oil is present.

The spacing on the belt as well as the height of the flights can be varied to meet the desired circumstances or requirements of use. The flights may be trimmed to permit riding between side boards and to prevent any backflow of conveyed material along the sides. With metal or wood flights such use is extremely hazardous to belt life. It will be understood that the belt may be made of as many fabric plies as desired, and the 5-ply belt has been herein illustrated merely by way of example. Similarly, the flight may be made of as many plies as required to impart, after vulcanization, such rigidity as may be required for the particular use to which the belt is put. However, the fabric plies of the base or flattened end portions 6' of the flight form should not be more than half the plies in the belt itself, in order to maintain the normal belt strength proximate the flights.

I claim:

1. A cleated belt comprising a belt web including reinforcing plies and a rubber-like superficial portion, there being a gap in said superficial portion to expose said reinforcing plies, a cleat member capable of vulcanization and including reinforcing plies bent into an L-shape, the leg of the L being disposed at a right angle to said web and the foot of the L being disposed parallel to said web in said gap in contact with said reinforcing plies, and a rubber-like superficial portion on said cleat member merging smoothly with said superficial portion of said web, said superficial portions, said cleat member and said web being vulcanized together.

2. In a conveyor belt of the vulcanized laminated fabric type having transversely extending flights; the improvement in which the belt is provided with longitudinally-spaced, transversely-extending cut-outs and the flights are of inverted T-shape and each flight has a flexible base forming the head of the T, the flights having their bases secured by vulcanization in the cut-out recesses in the belt and the upper surface of each base merging smoothly with the adjacent surfaces of the belt.

3. In a conveyor belt as set forth in claim 2, the further improvement in which the flights are of rubber-like material.

4. In a conveyor belt as set forth in claim 2, the further improvement in which the cut-outs in which the bases of the flights are secured extend through at least one layer of the fabric in the belt.

References Cited in the file of this patent

UNITED STATES PATENTS

| 417,065 | Miller | Dec. 10, 1889 |
| 2,264,332 | Peterson | Dec. 2, 1941 |
| 2,273,627 | Currie | Feb. 17, 1942 |